3,672,913
METHOD FOR THE CONTINUOUS MANUFACTURE OF LINKED SAUSAGE PRODUCTS

Everett V. Podebradsky, Madison, Wis., assignor to Oscar Mayer & Company, Inc., Madison, Wis.
No Drawing. Filed May 25, 1970, Ser. No. 40,372
Int. Cl. A22c *11/00;* A23b *1/04*
U.S. Cl. 99—109                                      6 Claims

ABSTRACT OF THE DISCLOSURE

When enough liquid smoke is used in the manufacture of weiners and smoky links to facilitate machine peeling of skins, an undesirable flavor and brown color tends to be imparted to the sausage. Addition of mono and/or di-saccharides in an amount between 15% and 40% to the liquid smoke eliminates this problem.

---

This invention relates to an improvement in the manufacture of linked sausage such as weiners and smoky links. More particularly, it relates to a method for treating a link sausage product with liquid smoke solution. U.S. Pat. 3,255,689 to Kielsmeier, Schmook, Jr., Macaulay, and Wandel describes a method and apparatus for the continuous manufacture of linked sausage products and the treatment of the in-process product with liquid smoke solution. U.S. Pat. 3,106,473 to Hollenbeck describes a method for manufacturing an aqueous smoke solution. This patent shows how to scrub a wood-smoke cloud with water to produce an aqueous extract or concentrate of the wood-smoke for use in a liquid smoke method of manufacturing linked meat products.

Also, in the method described by Kielsmeier et al., a final step involves the peeling of the skin from the completely processed links. When enough liquid smoke is used in such a method to facilitate machine peeling of the skins, an undesirable flavor tends to develop, and a brown color tends to develop.

It is an object of this invention to provide an improvement in the liquid smoke method for manufacturing linked meat products, which method results in a decreased amount of brown color formation, and which, somehow eliminates the development of undesirable flavor even though enough liquid smoke is used to facilitate machine skinning. It is a further object to provide these improvements in a method which is readily adaptable to well known liquid smoke sausage manufacturing methods.

These and other objects which will be apparent hereinafter are achieved in accordance with the method of this invention, which method involves the addition of mono- and/or di-saccharides to the liquid smoke solution, said saccharides being added in an amount sufficient to provide between about 15% and 40% by weight based on the weight of the solution.

Methods of continuously manufacturing linked sausage products are well known, and an illustrative method is described in U.S. Pat. 3,255,689 to Kielsmeier. The overall process includes the stuffing of sausage batter into casings, linking the stuffed casing, maintaining the links in end-to-end connected relationship, and carrying the links by means of an endless conveyor through a series of chambers in which they are smoked, cooked, and otherwise processed for marketing. At the end of the process the casing is removed mechanically from the processed sausage.

As described in the Kielsmeier patent referred to above the links can be sprayed with, or immersed in, a liquid smoke solution. A certain amount of contact time is permitted during which the liquid smoke solution is permitted to remain in contact with the individual links. The excess solution is then rinsed from the links. The rinsing of the excess smoke solution serves two purposes, namely to provide positive and accurate means of controlling the amount of smoke flavor absorbed by the product for producing products having uniform smoke flavor properties, and also to prevent spotting on the surface of the product by residual smoke droplets which tend to adhere to the product until the latter are rinsed. Nonetheless, in some circumstances, the rinsing step is sometimes dispensed with and evaporation or other means of removal of residual liquid smoke are relied on.

As used herein, the term "liquid smoke" refers to well known aqueous solutions or dispersions prepared by scrubbing or otherwise extracting a cloud of wood smoke. The term as used herein designates a solution of smoke-flavor imparting ingredients derived from wood smoke.

In accordance with this invention, linked sausages can be sprayed with a liquid smoke solution containing between about 15 and 40% mono and/or di-saccharides, preferably between 20 and 30% saccharides. The mono and di-saccharides which are useful in accordance with this invention include any edible mono or di-saccharides, for example, glucose, fructose, sucrose, and the like. The actual ingredients used for providing the mono or di-saccharides can include corn sugar syrup, for example.

In the following example all parts are expressed in parts by weight, and all percentages are expressed in percent by weight based on the weight of the overall composition. All temperatures are expressed in degree Fahrenheit.

EXAMPLE

A solution was made up of 80% of a liquid smoke solution sold under the trademark Charsol and 20% anhydrous dextrose. The resulting solution was heated to 160°. A continuous line of connected links of weiners was conveyed through the solution at a rate sufficient to provide a residence time of one to three minutes. Three minutes after being removed from the aqueous solution, the links were rinsed to remove excess smoke solution from the skin and were conveyed into heat treatment chambers in which the links were cooked to 170° F. internal temperature. After a sufficient residence in the cooking chamber the resulting cooked links were conveyed into a chilling chamber in which the links were sprayed with 0° F. brine to chill them. After chilling, the resulting weiners were skinned easily. They were found to have highly desirable flavor and color.

Control sausages were made with an identical batter under otherwise identical conditions, and with the same liquid smoke solution used in making the liquid smoke solution in the example, except that in the control test, the sugar was omitted from the smoke solution. The product of the example was observed to have less brown color and to have normal reddish-brown hue. The control sausages exhibited an undesirable flavor of liquid smoke, and a brown color. That particular characteristic was either masked, changed, or prevented from forming in accordance with this invention in the example. Even though I am unable to explain the chemical mechanism which causes the product of the method of this invention to be relieved of the undesirable flavor characteristic, the resulting product is nonetheless improved in that manner.

Although the amount of time in which the improved liquid smoke solution remains in contact with the sausage skin, in accordance with this invention, can be varied considerably, it is preferred that it be at least one minute, and preferably about three minutes. However, depending on the amount of smoke flavor and color desired, the time can be extended, if desired.

The concentration of the sugar should be in an amount of about 15% or more in order to achieve the desired improvement in flavor and color. In concentrations substantially less than this amount the beneficial result is not achieved to the desired degree. The concentration of sugar in the liquid smoke solution should not be substantially in excess of 40%. I have found that by using the relatively low concentrations of sugar, e.g., between 15 and 40%, the resulting smoke solution remains substantially "water thin" in viscosity and yet imparts the desired smoke flavor to the processed sausage.

If the liquid smoke solution is contacted with the linked sausage skin by spraying, it is apparent that the spraying must be sufficiently thorough to assure that the surface of the links is uniformly wetted with the solution.

I claim:

1. In a method for the continuous manufacture of linked sausage products including the steps stuffing a casing with a sausage batter, linking the stuffed casing, contacting the resulting links with a liquid smoke solution, heat processing the links to cook them, and machine peeling the casing from the processed links, the improvement in which the external surface of the casing of said resulting links is contacted with said liquid smoke solution, and said liquid smoke solution includes a member selected from the group consisting of mono and disaccharides wherein said member is present in the solution in an amount between about 15% and 40% by weight based on the weight of the solution, whereby said member aids in facilitating the peeling of the casing from the processed links.

2. In a method for the continuous manufacture of linked sausage products including the steps stuffing a casing with a sausage batter, linking the stuffed casing, contacting the resulting links with liquid smoke solution, heat processing the links to cook them, and machine peeling the casing from the processed links, the improvement in which the external surface of the casing of said resulting links is contacted with said liquid smoke solution, and the liquid smoke solution includes a member selected from the group consisting of glucose, sucrose, fructose and mixtures thereof wherein said member is present in an amount between 20% and 30% by weight based on the weight of the liquid smoke solution, whereby said member aids in facilitating the peeling of the casing from the processed links.

3. The method of claim 1 wherein said member is sucrose.

4. The method of claim 1 wherein said member is glucose.

5. The method of claim 1 wherein said member is fructose.

6. The method of claim 1 wherein said member is provided by addition of corn sugar syrup.

References Cited
UNITED STATES PATENTS

| | | | |
|---|---|---|---|
| 3,220,855 | 11/1965 | Shank | 99—229 X |
| 3,255,689 | 6/1966 | Kielsmeier et al. | 99—229 X |
| 3,330,669 | 7/1967 | Hollenbeck | 99—229 X |

HYMAN LORD, Primary Examiner

U.S. Cl. X.R.

99—229